United States Patent [19]

Plasse et al.

[11] Patent Number: 5,167,059
[45] Date of Patent: Dec. 1, 1992

[54] LOCK WIRE SECURING METHOD

[75] Inventors: Michel Plasse, Hackensack; Thomas E. Carr, East Brunswick; Robert H. Koehler, Secaucus; William E. Koehler, North Bergen, all of N.J.

[73] Assignee: Bergen Cable Technologies, Inc., Lodi, N.J.

[21] Appl. No.: 860,593

[22] Filed: Mar. 30, 1992

Related U.S. Application Data

[60] Continuation of Ser. No. 706,841, May 29, 1991, abandoned, Division of Ser. No. 422,574, Oct. 17, 1989, Pat. No. 5,052,094.

[51] Int. Cl.⁵ .............................................. B23P 19/00
[52] U.S. Cl. ..................................... 29/433; 29/452; 29/517; 29/252; 29/282
[58] Field of Search ............... 29/252, 188, 282, 255, 29/280, 452, 433, 517; 254/29 A

[56] References Cited

U.S. PATENT DOCUMENTS

| | | |
|---|---|---|
| 847,776 | 3/1907 | Huising . |
| 1,147,845 | 7/1915 | Brooks . |
| 1,182,602 | 5/1916 | Tuohy . |
| 1,277,305 | 8/1918 | Gerrard . |
| 1,408,846 | 3/1922 | Turner . |
| 1,555,819 | 10/1925 | Baruch . |
| 1,807,479 | 10/1929 | James . |
| 2,267,532 | 12/1941 | Moberg . |
| 2,764,861 | 6/1953 | Wenk, Jr. . |
| 3,353,227 | 4/1965 | Kabel . |
| 3,570,554 | 3/1971 | Kabel . |
| 3,658,296 | 4/1972 | Yegge . |
| 3,911,970 | 10/1975 | Lundberg . |
| 4,170,820 | 10/1979 | Klose . |
| 4,747,433 | 5/1988 | Dixon . |

Primary Examiner—Robert C. Watson
Attorney, Agent, or Firm—Bacon & Thomas

[57] ABSTRACT

The invention relates to a process for applying a ferrule to a lock wire and crimping the ferrule onto the lock wire. The process utilizes a lock wire having a ferrule applied to one end and which is placed through a plurality of threaded fasteners with a free end of a lock wire extending beyond the last of the threaded fasteners. The free end of the lock wire is inserted through a ferrule held in the apparatus and through a tensioning rod. Movement of the tensioning rod exerts a predetermined tension on the lock wire at which time the device crimps the ferrule onto the lock wire to retain it in place at the desired tension.

11 Claims, 5 Drawing Sheets

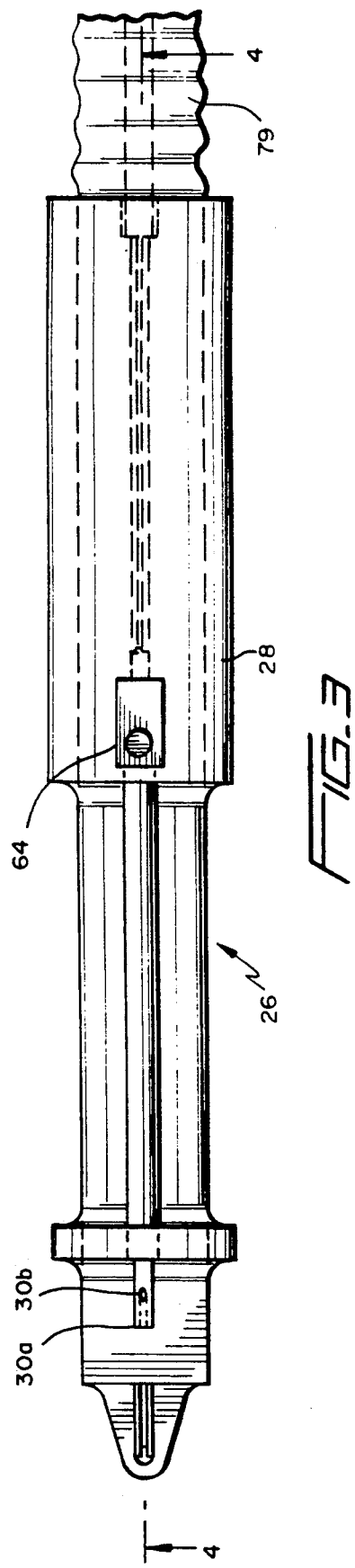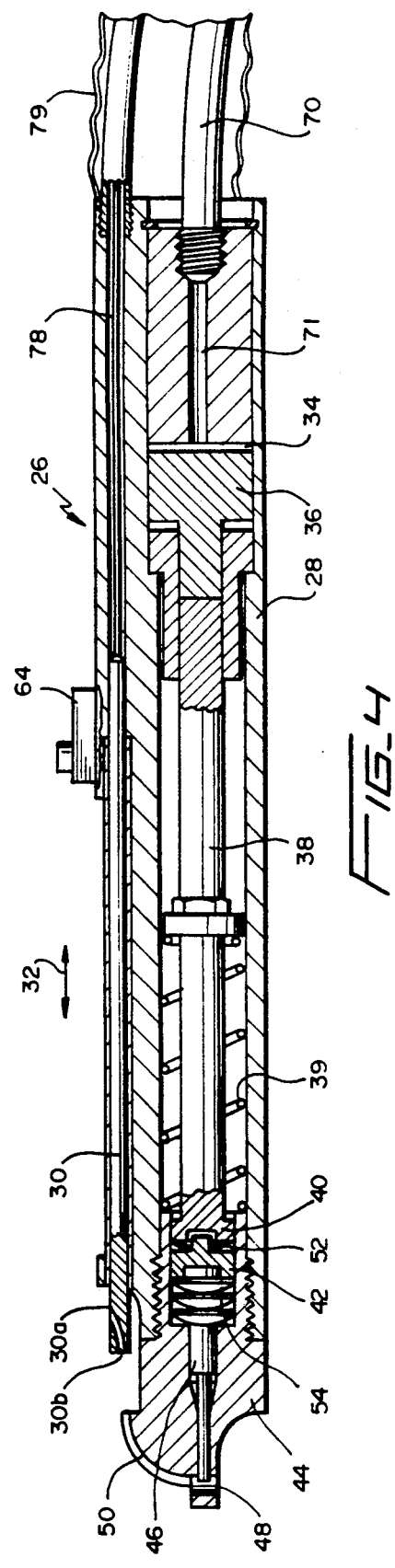

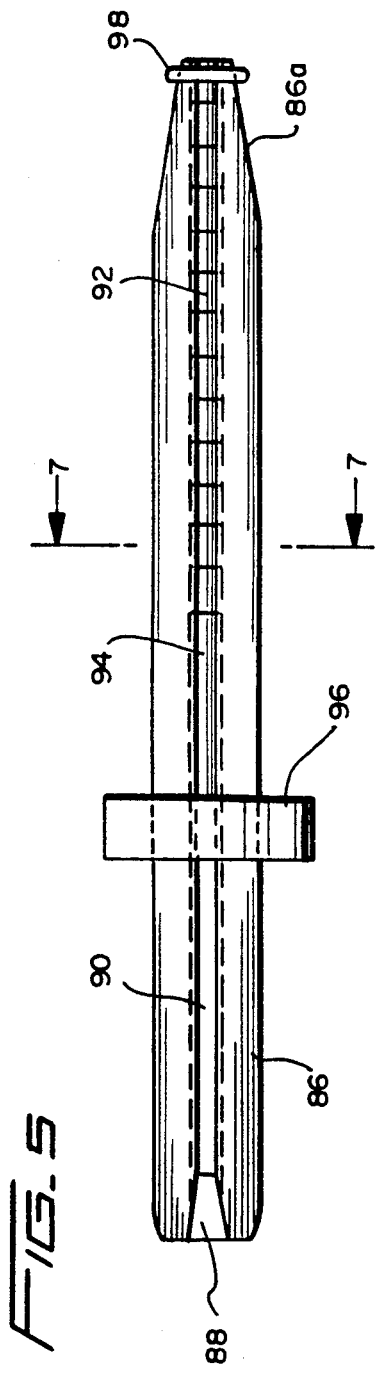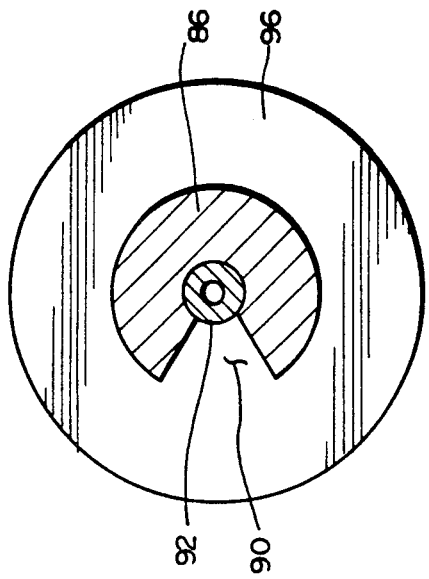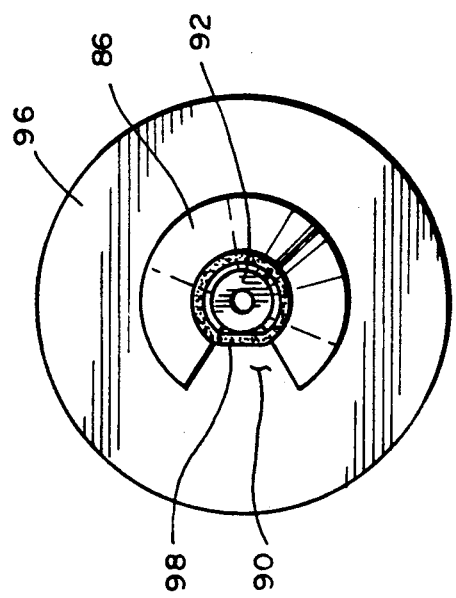

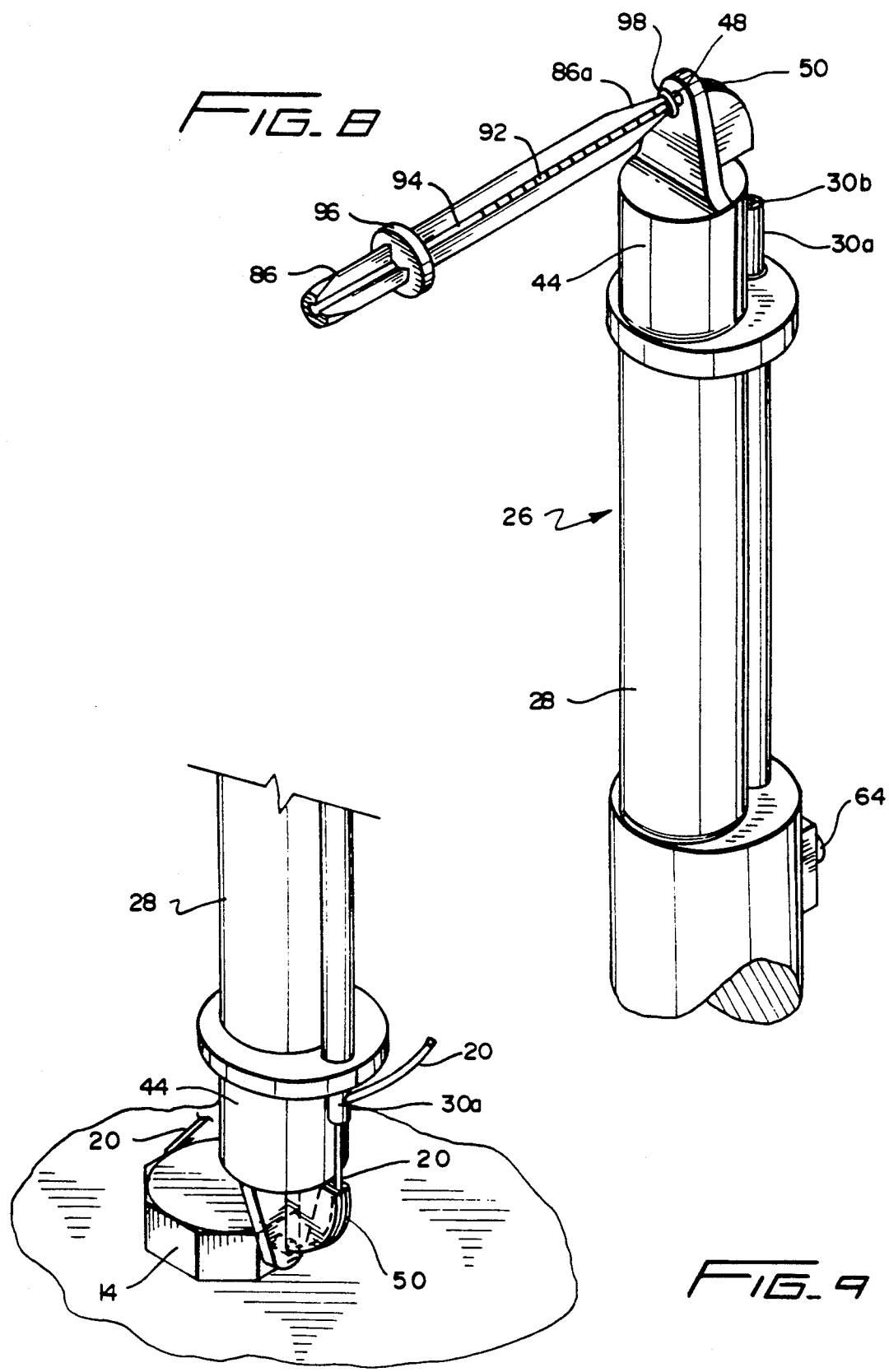

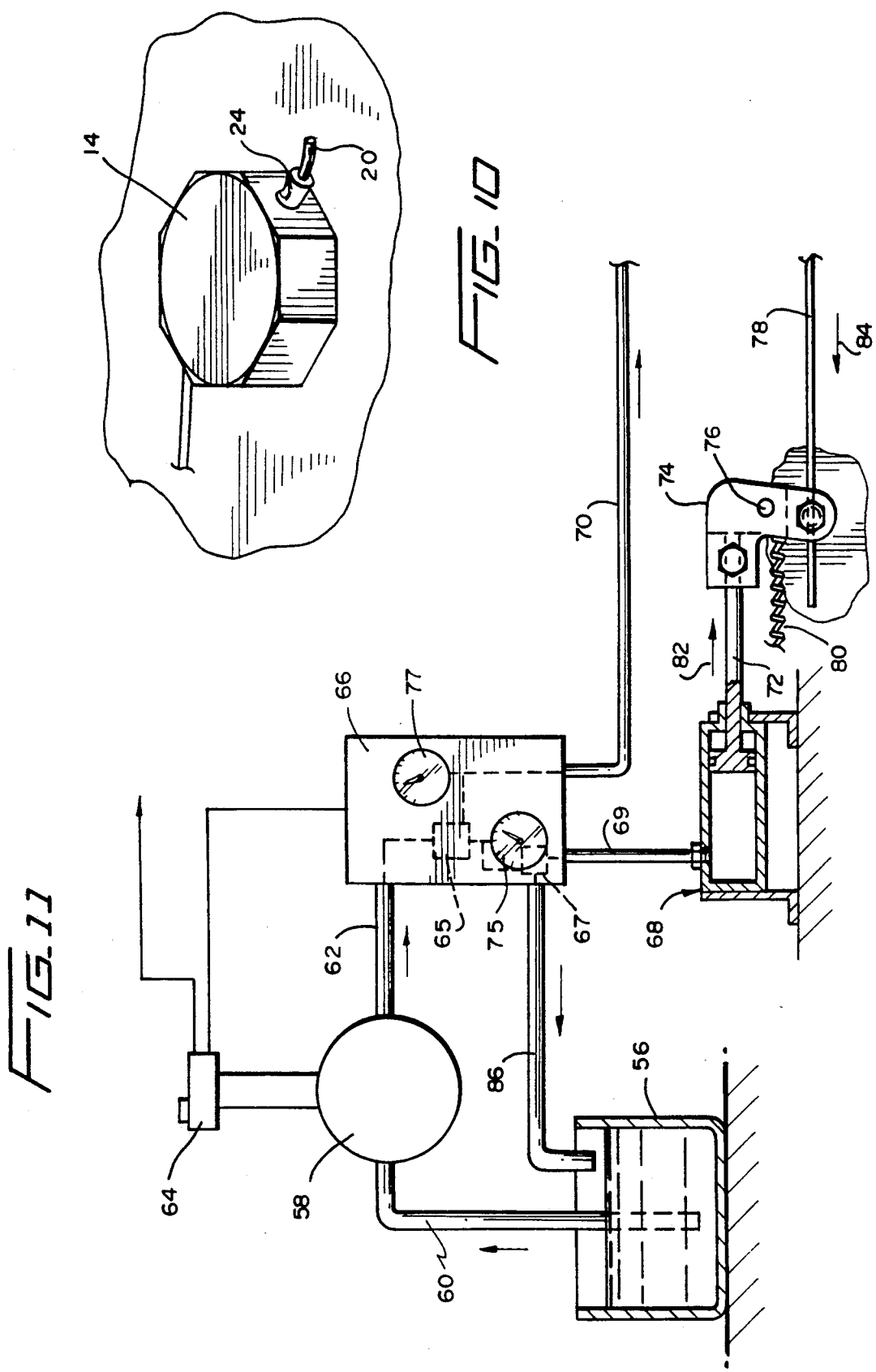

LOCK WIRE SECURING METHOD

This application is a continuation of application Ser. No. 07/706,841, filed May 29, 1991, which is a division of Ser. No. 07/422,574, filed Oct. 17, 1989, now Patent No. 5,052,094.

BACKGROUND OF THE INVENTION

The present invention relates to a tool for applying a ferrule to a lock wire tethering together a plurality of elements such as threaded fasteners.

In rotating machinery having close tolerances between the rotating and the stationary portions, such as turbines, it is imperative that all objects, no matter how small, be kept from contacting the rotating elements of the machinery. The presence of any foreign object could result in the catastrophic failure of the entire rotating machinery.

Such machinery is inherently complex and requires the usage of many nuts, bolts, screws and other threaded fasteners to assemble all of the components of the machine. Since the operation of such machinery may involve very high rotating speeds and induce vibrations into the machine elements, it is necessary to provide some means for preventing the inadvertent unthreading of the numerous threaded fasteners.

It is known to apply lock wires to tether threaded fasteners together to prevent their inadvertent unthreading. Typically, the lock wire passes through a transverse hole in at least two threaded fasteners and is twisted back on itself in alternating clockwise and counterclockwise directions between the threaded fasteners. The process is duplicated between additional threaded fasteners until the entire threaded fastener pattern has been wired. Following the required stringing and twisting, the lock wire is cut and bent into a certain position.

While the known lock wire has provided satisfactory results, it requires a very time consuming and laborious application process. Due to the dependency upon the operators skill in twisting the lock wire, often the final result is unsatisfactory due to variations in the quantity and tautness of the twists, and the variations in the tension on the lock wire. It has been estimated that annual losses of approximately $10,000,000 are incurred just from re-working unacceptable lock wire assemblies.

SUMMARY OF THE INVENTION

The present invention relates to a method for applying a ferrule to a lock wire, tensioning the lock wire to a pre-determined value and crimping the ferrule onto the lock wire. The method is used with a lock wire having a ferrule applied to one end and which is threaded through a plurality of threaded fasteners with a free end of the lock wire extending beyond the last of the threaded fasteners. The free end is inserted through a ferrule (held in apparatus for installing the lock wire) and through a tensioning rod. Movement of the tensioning rod exerts a predetermined tension on the lock wire at which time the device crimps the ferrule onto the lock wire to retain it in place at the desired tension. The free end of the lock wire extending beyond the attached ferrule is cut off to complete the process.

Essentially, the process involves providing first and last elements of a series that are to be connected together, for example threaded fasteners, providing apertures in the elements for receiving a flexible tension element, threading an elongated flexible tension element forwardly through the apertures serially from the first to the last element of the series, providing a first motion stopping means on a first end of a flexible tension element for preventing forward movement of the tension element through the aperture in the first element in the series, drawing a tension on the tension element in a forward direction from a location beyond the last element of the series while the first motion stopping means prevents forward motion of the tension element relative to the first element of the series, while maintaining said tension on said flexible tension element, securing the tension element against reverse longitudinal motion relative to the last element of the series by providing a second motion stopping means permanently associated with the tension element adjacent and beyond the last element of the series, with the second motion stopping means preventing reverse longitudinal movement of the tension means through the aperture of the last element of the series, whereby the elements of the series are connected together.

BRIEF DESCRIPTION OF THE DRAWINGS

FIG. 3 is a top view of an applicator for carrying out the present invention.

FIG. 4 is a cross-sectional view taken along line 4—4 in FIG. 3.

FIG. 5 is a top view of a magazine for storing and inserting the ferrules used in accordance with the invention.

FIG. 6 is an end view of the magazine viewed in the direction of arrow 6 in FIG. 5.

FIG. 7 is a cross-sectional view taken along 7—7 in FIG. 5.

FIG. 8 is a partial perspective view illustrating the magazine inserting a ferrule in the applicator for carrying out the invention.

FIG. 9 is a partial, perspective view illustrating the application of the ferrule and the tensioning of the lock wire according to the invention.

FIG. 10 is a perspective view of the ferrule applied to the lock wire in accordance with the invention.

FIG. 11 is a schematic diagram of the hydraulic power supply system associated with the applicator for carrying out the present invention.

DETAILED DESCRIPTION OF THE PREFERRED EMBODIMENT

Figure 1:
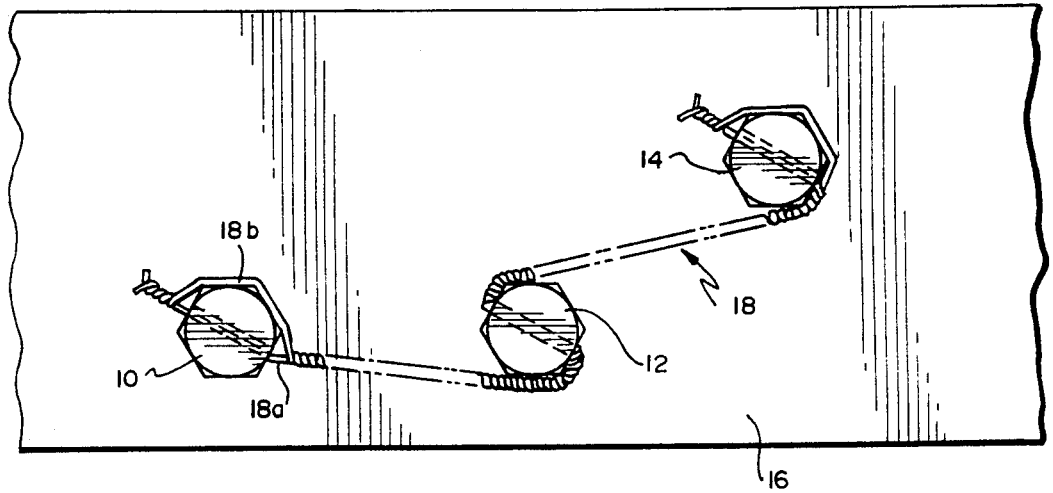
FIG. 1 is a plan view of a known lock wire.

A known lock wire is illustrated in FIG. 1 wherein separate elements such threaded fasteners 10, 12 and 14 are engaged with portion 16 of the rotating apparatus (not otherwise shown). The lock wire 18 comprises two strands 18a and 18b, twisted together at one end and separated such that strand 18a passes through a transverse opening in fastener 10 while strand 18b passes around the exterior of the fastener 10. The strands are twisted together on the opposite side of fastener 10 and pass through a transverse opening formed in fastener 12. The lock wire 18 continues until the last fastener, in this case fastener 14, whereupon one strand passes through a transverse opening in the fastener while the other strand passes around and contacts the exterior of the fastener. The strands are twisted together on the opposite side of fastener 14.

Figure 2:
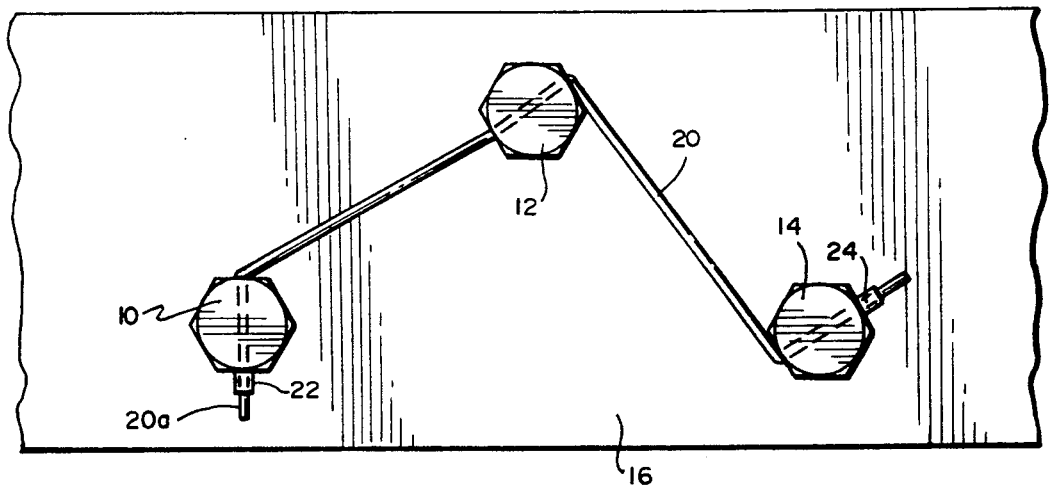
FIG. 2 is a plan view of a lock wire applied with apparatus according to this invention.

FIG. 2 illustrates a lock wire system applied using the apparatus and method for carrying out the process of the present invention. Threaded fasteners 10, 12 and 14 are engaged with machinery portion 16. Lock wire 20 (broadly referred to as a "flexible tension element"); comprises a single strand of wire having a ferrule 22 (herein broadly referred to as a motion stopping means); fixed to end 20a. Lock wire 20 is threaded forwardly through the transverse openings formed in the threaded fasteners 10, 12 and 14 until ferrule 22 bears against fastener 10. Ferrule 22 stops further forward motion of wire 20. At this point, ferrule 24 (also a motion stopping means) is inserted over the end of wire 20 against fastener 14, a tension is applied to the lock wire 20 and the ferrule 24 is crimped onto the lock wire such that it bears against a side of fastener 14 to prevent reverse motion of wire 20. Lock wire 20 is then cut off. The predetermined tension is maintained in lock wire 20 by the contact of ferrules 22 and 24 with threaded fasteners 10 and 14, respectively.

The applicator portion 26 of the apparatus for applying the ferrule to the second end of the lock wire is referred to as an applicator tool and is illustrated in FIGS. 3 and 4; Tool 26 comprises an elongated body including housing 28 having a tension rod 30 slidably mounted therein at the proximal end of the portion 26 and such that the end 30a of the tension rod extends axially outwardly of housing 28. End 30a defines a passage 30b from the distal end of the tension rod 30 to an upper surface thereof outside of the housing. Tension rod 30 is mounted in housing 28 so as to be axially movable in the directions of arrows 32 generally parallel to the longitudinal axis of housing 28 extending along line 4—4 in FIG. 3.

Housing 28 also defines a chamber 34 in which ferrule crimper actuator piston 36 is slidably retained so as to be also movable in the directions of arrows 32. Piston rod 38 extends from piston 36 and has rear anvil retainer 40 attached thereto. Spring 39 is interposed between piston rod 38 and crimp head 44 and biases the piston rod 38 toward the right as seen in FIG. 4.

Front anvil retainer 42 is arranged generally coaxially with piston rod 38 and is slidaly mounted in crimp head 44 attached to housing 28. Ferrule deforming punch 46 is connected to and extends axially from front anvil retainer 42.

Crimp head 44 defines a ferrule retaining and supporting aperture or opening 48 at the distal end of portion 26 and a tension guide notch 50. Guide notch 50 is dimensioned to receive the lock wire 20 prior to the insertion of the end through passage 30b of tension rod 30.

As illustrated in FIG. 4, front anvil retainer 42 is axially spaced from rear anvil retainer 40. This spaced position is maintained by curved spring washer 52 which biases the front anvil retainer 42 toward the left. Additional curved spring washers 54 are located between the crimp head 44 and the front anvil retainer 42. The biasing forces of the respective spring washers 52 and 54 are selected such that when the gap is present between rear anvil retainer 40 and front anvil retainer 42, the forming punch 46 extends slightly into the ferrule opening 48 in a direction transverse to the axis of opening 48. When a ferrule is inserted into 48, it displaces forming punch 48 to the right (as seen in FIG. 4) against the biasing force of spring washer 52. This biasing force urges the front anvil retainer 42 and consequently, the distal end of forming punch 46 toward the left to exert a non-deforming (non-crimping) frictional force on the ferrule located in opening 48. The frictional force exerted by forming punch 46 retains the ferrule in opening 48 with the axis of the ferrule extending generally transverse to the longitudinal axis of body 26; until the ferrule is applied to the lock wire.

Applicator 26 is connected to a power supply indicated schematically in FIG. 11. The power supply comprises a sump reservoir 56 containing an amount of a hydraulic fluid. Pump/motor 58 has inlet tube 60 extending into the sump 56 and an outlet conduit 62. The operation of the pump/motor 58 is controlled, in known fashion, by switch 64 mounted on casing 28 of the applicator 26. Outlet conduit 62 is connected to pressure cycle controller 66 which, in turn, controls the supply of pressurized hydraulic fluid to tension cylinder 68 and to hydraulic supply line 70. Hydraulic supply line 70 is connected to the proximal end of applicator 26 so as to communicate with chamber 34 via passage 71.

Tension cylinder 68 has an extendable and contractable piston rod 72 connected to bell crank 74 which is pivotally attached to a fixed structure at 76. Bell crank 74 is also connected to flexible tension rod 78, the opposite end of which is attached to tension rod 30 as seen in FIG. 4. Spring 80 biases the bell crank 74 in a counterclockwise direction around its pivot attachment point 76. Hydraulic supply line 70 and flexible tension rod 78 may be covered by a boot 79 extending from the applicator 26 to the power supply and formed of a flexible material.

Thus, as can be seen, when the pressure cycle controller 66 supplies hydraulic fluid to the tension cylinder 68 via conduit 69 causing extension of the piston rod 72 in the direction of arrow 82, bell crank 74 will pivot in a clockwise direction about pivot attachment point 76, moving the flexible tension rod 78 in the direction of arrow 84. As viewed in FIG. 4, this will move tension rod 30 toward the right relative to the casing 28 and the crimp head 44, thereby tensioning a lock wire inserted into passage 30b.

Pressure cycle controller 66 has a known pressure relief/bypass valve 67 to limit the hydraulic pressure that can be applied to tension cylinder 68. Once this predetermined pressure limit has been reached, the excess hydraulic fluid is returned to the sump 56 via conduit 86. By limiting the hydraulic pressure supplied to the tension cylinder 68, the amount of force imparted to flexible rod 78, tension rod 30, and, consequently, to the lock wire 20 will be limited to a predetermined value. Once this value is reached, pressure activated valve 65 opens and pressurized hydraulic fluid passes through line 70 into chamber 34 via passage 71 and urges piston 36, piston rod 38 and rear anvil retainer 40 to the left as shown in FIG. 4. The movement of the rear anvil retainer 40 deforms the spring washer 52 and brings the rear anvil retainer 40 into direct contact with front anvil retainer 42. Continued movement to the left causes forming punch 46 to also move in this direction to apply a crimping force to a ferrule retained in opening 48. Gauges 75 and 77 may be provided on the power supply to provide a visual indication of the tension and crimping pressures, respectively.

The magazine for retaining and inserting the ferrules into the applicator 26 is illustrated in FIGS. 5, 6 and 7 and comprises a magazine body 86 with a tapered end portion 86a. Body 86 defines a centrally located, longitudinally extending opening 88 extending completely along its length, as well as a longitudinally extending slot 90. Slot 90 interconnects the opening 88 with the exterior surface of the body 86. As illustrated in FIG. 7, slot 90 may be tapered in a radially outwardly extending direction such that the distance between its innermost edges is less than the diameter of the opening 88.

The diameter of opening 88 is sufficient to slidably accommodate a plurality of axially aligned ferrules 92 therein. Opening 88 also slidably accommodates a feed rod 94 which bears against one end of the supply of ferrules 92 and which is connected to handle 96. An elastic friction element 98 is located around the end of body 86 and, as illustrated in FIG. 6, exerts a slight frictional force on the ferrule 92 located closest to the end of body 86. This frictional force is sufficient to retain the ferrules 92 in the body 86 as the device is manipulated by the operator. Handle 96 and feed rod 94 are both slidable with respect to the main body 86, but the interconnection has sufficient frictional force to prevent the handle 96 and the feed rod 94 from falling out of the body 86 should it be manipulated into a vertical position.

The process according to the invention is illustrated in FIGS. 8 and 9. As illustrated in FIG. 8, the magazine body 86 is placed against the crimp head 44 such that the opening 88 is in alignment with opening 48. Handle 96 and feed rod 94 are axially displaced with respect to the body 86 to force a ferrule 92 into the opening 48. As discussed previously, the ferrule 92 is frictionally retained in the opening 48 by the force of spring washer 52 urging the forming punch 46 against the ferrule 92. This force is sufficient to retain the ferrule 92 into the opening 48, but is insufficient to cause any deformation of the ferrule.

When the ferrule has been loaded into the opening 48, the magazine is removed from the applicator 26. The applicator 26 is manipulated such that lock wire 20 is threaded through the ferrule retained in the opening 48, through the notch 50 and through passage 30b formed in tension rod 30, as shown in FIG. 9. The applicator 26 is then manipulated to a position wherein ferrule 92 bears against the side of threaded fastener 14 and the switch 64 is actuated. Preferably, the housing 28 as illustrated is dimensioned so as to be manipulable by an operator.

By actuating switch 64, hydraulic fluid is supplied to the tension cylinder 68, which in turn, retracts the rod 30 further into the housing 28 to exert a tension on lock wire 20. The notch 50 is curved such that the wire adjacent to the ferrule retained in the applicator is tensioned in a direction in approximately coaxial alignment with the opening in the ferrule and the opening in the threaded fastener 14. Once the predetermined tension has been applied to lock wire 20, forming punch 46 is further displaced (toward to the left as viewed in FIG. 4) to deform the ferrule and fixedly attach it to the lock wire 20. Forming punch 46 is moved via its interconnection with front anvil retainer 42 which, at this point, is in direct contact with the rear anvil retainer 40 moved by its connection with piston 36 through piston rod 38.

Once the ferrule has been sufficiently deformed, the punch 46 will be withdrawn by reducing the hydraulic fluid pressure in chamber 34 and is retracted by the force exerted thereon by spring washers 54. Spring 39 returns piston 36 and piston rod 38 to their initial positions shown in FIG. 4. The operation is completed by cutting off the lock wire 20 downstream of the ferrule 92.

The foregoing description is provided for illustrative purposes only and should not be construed as in any way limiting this invention, the scope of which is defined solely by the appended claims.

What is claimed is:

1. A process for connecting together a series of elements, said series including a first and last element of the series, comprising:
   providing apertures in said elements for receiving a flexible tension element;
   threading an elongated flexible tension element forwardly through said apertures serially from the first to the last element of the series;
   providing a first motion stopping means on a first end of a flexible tension element for preventing forward movement of the tension element through the aperture in the first element in the series;
   drawing a tension on the tension element in a forward direction from a location beyond the last element of the series while the first motion stopping means prevents forward movement of the tension element relative to the first element of the series;
   while maintaining said tension on said flexible tension element, securing the tension element against reverse longitudinal motion relative to the last element of the series by providing a second motion stopping means permanently associated with the tension element adjacent and beyond the last element of the series, said second motion stopping means preventing reverse longitudinal movement of the tension means through the aperture of the last element of the series, whereby the elements of the series are connected together;
   wherein said elements are fasteners anchored to an object through rotation of the fastener in a coupling direction while engaging the object, and including the step of threading said tension element through each fastener aperture, whereby said fasteners are prevented from rotating in an uncoupling direction.

2. A process as claimed in claim 1 including permanently associating said first stopping means with the tensioning element, whereby the fasteners of the series are permanently connected together so long as the tension element remains intact.

3. A process as claimed in claim 1 including providing a permanently deformable ferrule installed over the tension element as said second motion stopping means, said step of permanently associating the second stopping means with the tension element including permanently crimping the ferrule onto the tension element.

4. A process as claimed in claim 1 including tensioning said tension element up to a predetermined force before permanently associating said second motion stopping means with the tension element.

5. A process as recited in claim 3, including providing a combination tension element tensioning and ferrule crimping tool, the tool including a longitudinal axis and having proximal and distal ends, a tension element tensioner movable along the longitudinal axis and arranged to exert a tension on the tension element by drawing the tension element toward the tool proximal end from the tool distal end, and a ferrule crimper movable along the tool longitudinal axis for crimping a ferrule retained within the tool at its distal end onto the tension element, said tool being manipulable for placement of a distal end area of the tool and the ferrule adjacent the last element or fastener of the series, and wherein the steps of drawing the tension on the tension element and crimping the ferrule includes placing a ferrule in the tool, threading the tension element through the ferrule and into engagement with the tension element tensioner of the tool; activating the tensioner along the tool axis to tension the tension element while the tool is manipulated to place the distal end area of the tool against the last element or fastener of the series to react the tension load; activating the tool ferrule crimper while the tension is maintained on the tension element by the tensioner to crimp the ferrule to the tension element adjacent the last element or fastener of the series, and removing the tool from the tension element.

6. A process as claimed in claim 5, including placing and retaining the ferrule in the tool so that the tension element must be threaded through the ferrule in a direction transverse to the tool longitudinal axis.

7. A process as claimed in claim 6 including retaining the ferrule in the tool by engaging the ferrule with the ferrule crimper while the crimper is located in a non-crimping ferrule gripping position before threading the tension element through the ferrule.

8. A process for connecting together a series of elements, said series including a first and last element of the series, comprising:

providing apertures in said elements for receiving a flexible tension element;

threading an elongated flexible tension element forwardly through said apertures serially from the first to the last element of the series;

providing a first motion stopping means on a first end of a flexible tension element for preventing forward movement of the tension element through the aperture in the first element in the series;

drawing a tension on the tension element in a forward direction from a location beyond the last element of the series while the first motion stopping means prevents forward movement of the tension element relative to the first element of the series;

while maintaining said tension on said flexible tension element, securing the tension element against reverse longitudinal motion relative to the last element of the series by providing a second motion stopping means permanently associated with the tension element adjacent and beyond the last element of the series, said second motion stopping means preventing reverse longitudinal movement of the tension means through the aperture of the last element of the series, whereby the elements of the series are connected together; and including providing a permanently deformable ferrule installed over the tension element as said second motion stopping means, said step of permanently associating the second stopping means with the tension element including permanently crimping the ferrule onto the tension element;

and including providing a combination tension element tensioning and ferrule crimping tool, the tool including a longitudinal axis and having proximal and distal ends, a tension element tensioner arranged to exert a tension on the tension element by drawing the tension element toward the tool proximal end from the tool distal end, and a ferrule crimper movable generally parallel to the tool longitudinal axis for crimping a ferrule retained within the tool at its distal end onto the tension element, said tool being manipulable for placement of a distal end area of the tool and the ferrule adjacent the last element or fastener of the series, and wherein the steps of drawing the tension on the tension element and crimping the ferrule include placing a ferrule in the tool, threading the tension element through the ferrule and into engagement with the tension element tensioner of the tool; activating the tensioner to tension the tension element while the tool is manipulated to place the distal end area of the tool against the last element or fastener of the series to react the tension load; activating the tool ferrule crimper while the tension is maintained on the tension element by the tensioner to crimp the ferrule to the tension element adjacent the last element or fastener of the series, and removing the tool from the tension element.

9. A process as claimed in claim 8, including placing and retaining the ferrule in the tool so that the tension element must be threaded through the ferrule in a direction transverse to the tool longitudinal axis.

10. A process as claimed in claim 9 including retaining the ferrule in the tool by engaging the ferrule with the ferrule crimper while the crimper is located in a non-crimping ferrule gripping position before threading the tension element through the ferrule.

11. A process for connecting together a series of elements, said series including a first and last element of the series, comprising:

providing apertures in said elements for receiving a flexible tension element;

threading an elongated flexible tension element forwardly through said apertures serially from the first to the last element of the series;

providing a first motion stopping means on a first end of a flexible tension element for preventing forward movement of the tension element through the aperture in the first element in the series;

drawing a tension on the tension element in a forward direction from a location beyond the last element of the series while the first motion stopping means prevents forward movement of the tension element relative to the first element of the series;

while maintaining said tension on said flexible tension element, securing the tension element against reverse longitudinal motion relative to the last element of the series by providing a second motion stopping means permanently associated with the tension element adjacent and beyond the last element of the series, said second motion stopping means preventing reverse longitudinal movement of the tension means through the aperture of the last element of the series, whereby the elements of the series are connected together; and wherein said elements are fasteners anchored to an object through rotation of the fastener in a coupling direction while engaging the object, and including the step of threading said tension element through each fastener aperture in a direction such that tension applied to the tension element in a forward direction urges at least one of the fasteners to rotate in a coupling direction.

* * * * *